（12）United States Patent
Gagnon

(10) Patent No.: US 10,491,939 B2
(45) Date of Patent: Nov. 26, 2019

(54) CLEAR SCREEN BROADCASTING

(71) Applicant: LVL Studio Inc., Montréal (CA)

(72) Inventor: Jean-François Gagnon, Repentigny (CA)

(73) Assignee: LVL STUDIO INC., Montreal (CA)

( * ) Notice: Subject to any disclaimer, the term of this patent is extended or adjusted under 35 U.S.C. 154(b) by 0 days.

(21) Appl. No.: 14/243,303

(22) Filed: Apr. 2, 2014

(65) Prior Publication Data

US 2014/0298369 A1  Oct. 2, 2014

Related U.S. Application Data

(60) Provisional application No. 61/807,415, filed on Apr. 2, 2013.

(51) Int. Cl.
*H04N 21/41* (2011.01)
*H04N 21/435* (2011.01)
(Continued)

(52) U.S. Cl.
CPC ... *H04N 21/4122* (2013.01); *H04N 21/23439* (2013.01); *H04N 21/25816* (2013.01); *H04N 21/435* (2013.01); *H04N 21/4627* (2013.01); *H04N 21/478* (2013.01); *H04N 21/6543* (2013.01); *H04N 21/8126* (2013.01)

(58) Field of Classification Search
CPC .......... H04N 21/4126; H04N 21/4722; H04N 21/4227; H04N 21/812; H04N 21/4122; H04N 21/41407; H04N 21/435; H04N 21/8126; H04N 21/4627; H04N 21/25816; H04N 21/478; H04N 21/23439;
(Continued)

(56) References Cited

U.S. PATENT DOCUMENTS 4,768,188 A * 8/1988 Barnhart ................... H04J 3/08
370/434
6,295,321 B1 * 9/2001 Lyu ..................... H04N 21/6332
375/240.25
(Continued)

FOREIGN PATENT DOCUMENTS

CN  1208965  6/2005
CN  101202825  6/2008
(Continued)

*Primary Examiner* — Benjamin R Bruckart
*Assistant Examiner* — Jen-Shi Huang
(74) *Attorney, Agent, or Firm* — Benoit & Cote Inc.; Charles-Andre Caron

(57) ABSTRACT

System and method for providing clear screen TV broadcasting to subscribed users. Two signals are provided by the broadcasters for the same channel: a mixed signal that includes the main program and additional content to overlap portions of the main program on the display, and a clear screen signal which includes only the main program. By default, decoding machines e.g. STB at the user's location, are adapted to decode the mixed signal to output on the display the main program and the additional content. The embodiments provide a mechanism to provide the additional content separately to subscribed users and switch the decoding at the STB to the clear screen mode for decoding and outputting the clear TV signal instead of the mixed signal.

15 Claims, 10 Drawing Sheets

(51) Int. Cl.
*H04N 21/478* (2011.01)
*H04N 21/2343* (2011.01)
*H04N 21/258* (2011.01)
*H04N 21/6543* (2011.01)
*H04N 21/81* (2011.01)
*H04N 21/4627* (2011.01)

(58) Field of Classification Search
CPC ..... H04N 21/6543; G06F 15/16; G06F 3/048; G08C 2201/93; H04H 2201/40; G06Q 30/0267
See application file for complete search history.

(56) References Cited

U.S. PATENT DOCUMENTS

| | | | |
|---|---|---|---|
| 8,108,569 | B1 | 1/2012 | Breau et al. |
| 8,566,158 | B2 | 10/2013 | Cansler et al. |
| 8,584,164 | B2 | 11/2013 | Walter et al. |
| 8,601,519 | B1 | 12/2013 | Hicks, III et al. |
| 8,640,153 | B2 | 1/2014 | Gatto et al. |
| 8,661,485 | B2 | 2/2014 | Walter et al. |
| 8,671,429 | B1 | 3/2014 | Lee et al. |
| 2002/0178446 | A1* | 11/2002 | Sie et al. ................ 725/32 |
| 2003/0084440 | A1* | 5/2003 | Lownes ................... 725/6 |
| 2003/0149618 | A1* | 8/2003 | Sender ............... G06Q 30/02 705/14.55 |
| 2003/0181160 | A1* | 9/2003 | Hirsch ................ H04H 40/90 455/3.02 |
| 2003/0196211 | A1* | 10/2003 | Chan ........... H04N 21/234363 725/131 |
| 2004/0116070 | A1* | 6/2004 | Fishman ............. H04H 20/106 455/3.02 |
| 2005/0089168 | A1* | 4/2005 | Kahre ................... H04N 7/165 380/211 |
| 2005/0216933 | A1* | 9/2005 | Black ................... H04N 7/163 725/34 |
| 2007/0154169 | A1* | 7/2007 | Cordray ............ H04N 5/44543 386/230 |
| 2012/0020428 | A1* | 1/2012 | Roth et al. ................. 375/295 |
| 2012/0284745 | A1* | 11/2012 | Strong ............... H04N 21/812 725/34 |
| 2013/0027613 | A1* | 1/2013 | Kim .................. H04N 21/4126 348/563 |
| 2013/0036442 | A1* | 2/2013 | Wingert ......... H04N 21/42209 725/60 |
| 2013/0055329 | A1 | 2/2013 | Pearson et al. |
| 2013/0139211 | A1 | 5/2013 | Gorti et al. |
| 2013/0173765 | A1* | 7/2013 | Korbecki ........ H04N 21/42209 709/221 |
| 2013/0227013 | A1 | 8/2013 | Maskatia et al. |
| 2013/0276032 | A1 | 10/2013 | Walter et al. |
| 2014/0026163 | A1 | 1/2014 | Trauth |

FOREIGN PATENT DOCUMENTS

| | | |
|---|---|---|
| CN | 102981758 | 3/2013 |
| CN | 101707665 | 11/2013 |
| EP | 0915621 | 10/1998 |
| GB | 2399976 | 1/2007 |
| JP | 2009071432 | 4/2009 |
| KR | 100883982 | 2/2009 |
| WO | WO 2007092123 | 8/2007 |
| WO | WO 2008001308 | 1/2008 |
| WO | WO 2013028578 | 2/2013 |

\* cited by examiner

Tap channel logo to sync

Tap icon to view all Clear screen channels with box score previews

Other CS games

Box scores belonging to games with clearscreen

CLEAR SCREEN BROADCASTING

CROSS-REFERENCE TO RELATED APPLICATIONS

This application claims priority under 35 USC § 119(e) of U.S. provisional patent application 61/807,415 filed on Apr. 2, 2013, the specification of which is hereby incorporated by reference.

BACKGROUND (a) Field

The subject matter disclosed generally relates to the field of television (TV) broadcasting.

(b) Related Prior Art

Very frequently, TV broadcasters include additional content to the main program that is being broadcasted on their channel. The broadcasted content may sometime be provided at the lower end of the screen, at one of the sides, and/or at one of the corners.

The additional content may sometimes be related to the program that is being broadcasted such as the statistics associated with a sports game. Some other times, the additional content may have no relation to what is being broadcasted. For example, advertisements, news headlines, etc.

An example of such additional content is illustrated in FIG. 1 which shows a TV screen 10 including an area 12 for the main program and an area 14 on the right side of the screen for additional content such as statistics of previous and current games.

Viewers are often annoyed by the additional content, and prefer to watch the main program on the entire screen. Additionally, when the screen on which the channel is displayed is a large screen, the surface area for the additional content becomes hard to ignore.

Therefore, there is a need for a system and method which allow users to watch TV programs on the entire screen without being bothered by the additional content.

SUMMARY

The present embodiments provide such system and method.

In an aspect, there is provided a method for providing clear screen TV broadcasting to a user having a set-top box (STB) and a TV display connected to the STB, the method comprising: receiving additional content for one or more TV channels from TV broadcasters associated with the one or more TV channels, the additional content for a given channel comprising televised content other than a main program being aired on the given channel; receiving an authentication request from a computing device associated with a subscribed user; identifying an STB associated with the subscribed user; upon authentication, causing the STB associated with the user to output a video signal to the TV display in a clear screen mode free from the additional content; and sending the additional content to the computing device for viewing thereon instead of on the TV display.

The method may further comprise identifying a channel being currently watched on the TV display; and sending the additional content associated with the channel being currently watched to the computing device for display.

The identifying may comprise receiving an identification of the channel being currently watched from the STB or the computing device.

The method may further comprise upon authentication sending instructions to the STB to switch to a clear screen mode for all channels.

In an embodiment, the method further comprises providing the additional content as event cards for selection and viewing on the computing device.

The method may also comprise receiving a user selection of an event card and displaying the additional content associated with the selected event card on the TV display.

The TV display may be a television device, video projector, or the like.

In an embodiment, causing the STB comprises sending instructions to the STB to detect and decode a different TV signal for the given channel. In another embodiment, causing the STB comprises sending decryption keys to the STB to decode an encrypted clear screen TV signal for the given channel.

In another aspect, there is provided a set-top box (STB) for providing clear screen TV broadcasting, the STB comprising: an input module adapted to receive an encoded cable signal from a cable TV provider, the encoded cable signal comprising for a given channel a mixed TV signal and a clear screen TV signal, wherein the mixed TV signal comprises a main program and additional televised content to be displayed with and/or over the main program, and the clear screen TV signal comprises the main program free from the additional content; an output for connecting to a TV display; a processor for decoding the encoded cable signal to output a video signal representative of the given channel on the TV display; and a communication interface adapted to interface with a remote device for receiving instructions to switch between a mixed mode and a clear screen mode.

In an embodiment, the STB is, by default, adapted to decode the mixed TV signal for the given channel to output a first video signal comprising the main program and the additional content, and upon receipt of instructions to switch to a clear screen mode the STB causes the processor to decode the clear screen TV signal for the given channel to output a second video signal representing only the main program free from additional content.

The STB may be adapted to receive the additional content and send the additional content to a home device associated with the STB using a home network, the home device being different than the remote device.

In another embodiment, the STB receives the additional content from the remote device or the cable TV provider.

The STB may also be adapted to receive a user selection of a given additional content while in the clear screen mode and insert the additional content in the second video signal for output on the TV display in the clear screen mode.

In another embodiment, the STB is adapted to receive decryption keys for decrypting the clear screen TV signal.

In a further aspect, there is provided a system for providing clear screen TV broadcasting to a user from a broadcaster adapted to send a main program in a mixed TV signal with additional content other than the main program, and in a clear screen TV signal including only the main program, the user having a TV display connected and a set-top box (STB) adapted to decode the mixed TV signal by default and output the video signal to the TV display, the system comprising: a server comprising a list of subscribed users and an identification of an STB associated with each subscribed user, the server being adapted to receive the additional content from the broadcaster for a given channel.

Wherein upon receiving an authentication request from a computing device associated with a subscribed user, the server identifies the STB associated with the subscribed user and causes the STB to decode the clear TV signal instead of the mixed TV signal to output a video signal to the TV display representing only the main program; the server being also adapted to send the additional content to the computing device after authentication for viewing thereon instead of on the TV display.

The system may provide the additional content in the form of event cards for selection and viewing on the computing device.

In another embodiment, the system is adapted to receive a user selection of an event card for viewing on the TV display, and send the event card to the STB for adding to the clear TV signal.

The server may be adapted to provide the STB with decryption keys for decrypting the clear TV signal.

The server may also be adapted to provide the additional content in real time or near time for displaying on the computing device in accordance with a progress of the main program on the TV display.

In an embodiment, the system may be adapted to make available a set of computer readable instructions which when received and executed on the computing device implement an interface which allows the user to request authentication and receive the additional content from the server.

According to an embodiment, there is provided a method for providing clear screen TV broadcasting to a user having a set-top box and a TV display connected to the set-top box. The method comprises: receiving additional content for one or more TV channels from TV broadcasters associated with the one or more TV channels; receiving an authentication request from a computing device associated with a subscribed user, the authentication request including an identification of a channel from the one or more TV channels that the user wants to see in a clear screen mode; sending instructions to the set-top box associated with the user to switch the channel to the clear screen mode, whereby the user may view the channel on the TV display in the clear screen mode without additional content; and sending the additional content associated with the channel to the computing device for viewing thereon instead of on the TV display.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

The embodiments describe a method and system for providing clear screen TV broadcasting to subscribed users. In an embodiment, two signals are provided by the broadcasters for the same channel: a mixed signal that includes the main program and additional content to overlap portions of the main program on the display, and a clear screen signal which includes only the main program. By default, decoding machines e.g. STB at the user's location, are adapted to decode the mixed signal to output on the display the main program and the additional content. The embodiments provide a mechanism to provide the additional content separately to subscribed users and switch the decoding at the STB to clear screen mode for decoding and outputting the clear TV signal instead of the mixed signal.

The description describes several non-limiting examples for implementing the embodiments. However, it should be noted that several modifications may be made by the person skilled in the art without departing from the scope of this disclosure. For example, the additional content may be sent to the computing device used for authenticating with the clear screen server which sends the instructions to the STB to switch modes. Other embodiments are also contemplated whereby the computing device may communicate with the STB using the home network and may receive the additional content from the STB. Further embodiments are also contemplated whereby the computing device communicates with the server and the STB, and the server communicates with the STB through the computing device. In other words the server may and may not have to communicate directly with the STB. In another method the server may communicate with the STB through the broadcaster and/or provider etc.

Figure 1:
FIG. 1 illustrates a TV screen displaying a main program and additional content on the side.
Figure 2:
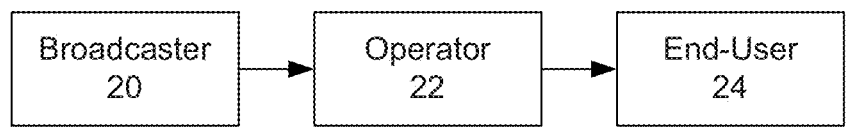
FIG. 2 illustrates a typical production chain for TV broadcasting.

FIG. 2 illustrates a typical production chain for TV broadcasting. As illustrated in FIG. 2, the TV production chain comprises a broadcaster 20, an operator 22 and an end user 24. The broadcaster 20 has typically a TV channel associated therewith. The end user 24 may view the programs produced by a specific broadcaster (producer) by selecting the TV channel associated with that producer on the TV display. Examples of TV channels include CNN, CBS, CBC, Fox Network etc. It is possible sometimes that a single broadcaster has more than one TV channels associated therewith.

The operator 22 is the entity that transfers the TV signal for a specific channel/broadcaster to the end user 24 using some sort of communications network. Examples of operators include: Bell™, Rogers™, Videotron™, Dish Network™, etc. Usually the operator 22 provides the end user 24 with a set-top box (aka STB) which allows the user to scroll through different channels from different broadcasters.

Figure 3:
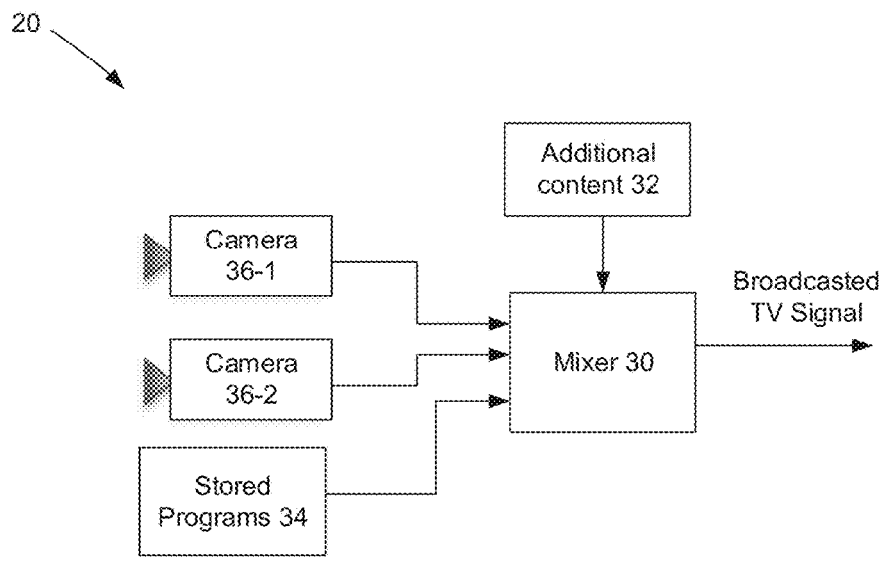
FIG. 3 is a block diagram illustrating the major components of a conventional broadcaster.

FIG. 3 is a block diagram illustrating the major components of a conventional broadcaster 20. As show in FIG. 3, the broadcaster 20 includes a mixer 30, an additional content module 32, a stored programs module 34, and a plurality of cameras 36. In operation, the mixer 30 mixes the content of the main program with additional content from the module 32. The main program may either be fed into the mixer 30 directly from one or more cameras 36 such as during the broadcasting of a sports game or a live event, or may be pre-recorded and stored in a stored programs module 34, such as when a previously recorded game is re-broadcasted, or a movie, or any other pre-recorded show.

The additional content 32 may include advertisements, game statistics, schedule for TV programs that are to be aired in the future on the TV channel, news headlines, weather forecasts, name/logo of the channel or any type of additional information which does not make part of the main program that is being broadcasted. The additional content in the module 32 may and may not be in sync with the main program. The additional content usually overlaps the main program on a portion or sometimes the entirety of the display on which the TV signal is reproduced.

Referring back to FIG. 3, the output of the mixer 30 is an encoded TV signal comprising a mix of the main program originating from the cameras 36 or the stored programs module 34, and additional content from the module 32. When properly decoded, the encoded TV signal will be reproduced on the screen (aka TV display) (or a video projector) to illustrate the main program as well as the additional content that was inserted by the mixer 30.

Figure 4:
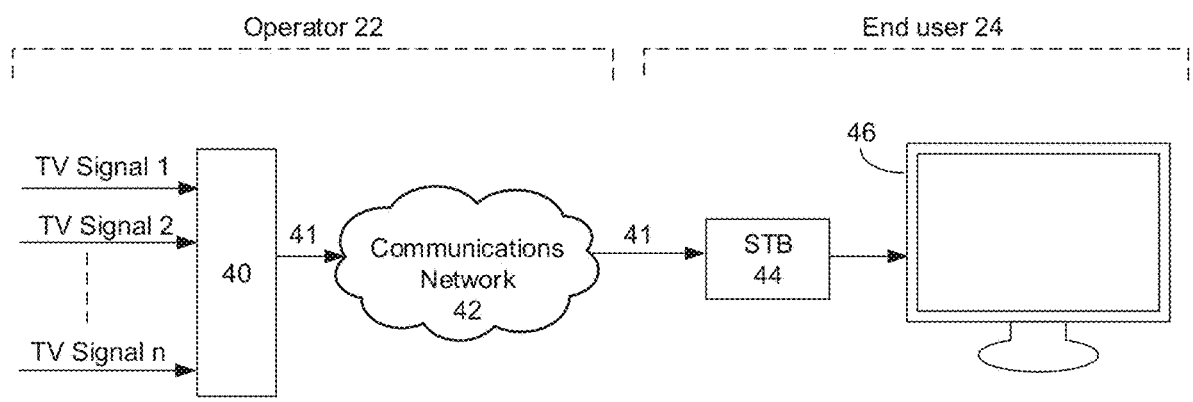
FIG. 4 is a block diagram illustrating the major components of a an operator and an end user.

FIG. 4 is a block diagram illustrating the major components of an operator 22 and an end user 24. As shown in FIG. 4, the operator 22 receives a plurality of TV signals from one or more broadcasters 20, and combines the TV signals using an encoder 40, e.g., multiplexer or the like, and sends the encoded signal 41 over a telecommunications network 42. The telecommunications network 42 may include a plurality of sub-networks including but not limited to: the internet, cable TV network, wireless data networks, satellite networks, fiber optic networks, local area networks, wide area networks, Wi-Fi, and/or any combination of the above. The end user 24 receives the encoded signal 41 over the telecommunications network 42. An STB 44 decodes the encoded signal 41 and sends the decoded signal to the TV display 46 (or video projector) for displaying the selected channel on the TV display 46.

As discussed above, the user has no control over the content broadcasted other than selecting the channel that they want to watch.

Figure 5:
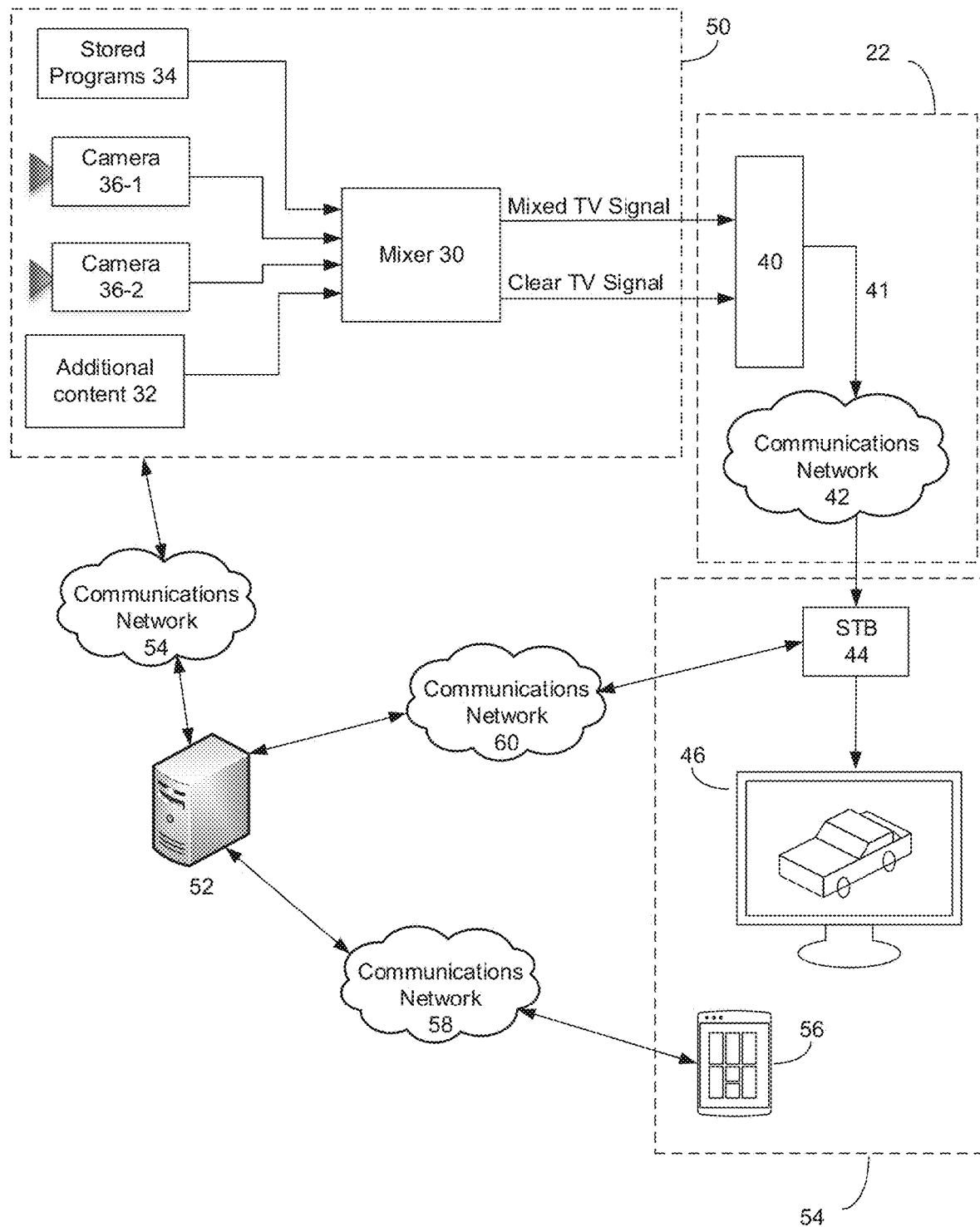
FIG. 5 is a block diagram of an exemplary system for clear screen TV broadcasting, in accordance with an embodiment.

FIG. 5 is a block diagram of an exemplary system for clear screen TV broadcasting, in accordance with an embodiment. As shown in FIG. 5, the system comprises a broadcaster 50, an operator 22, a clear screen server 52, and an end user 54. The broadcaster 50, in accordance with an embodiment, is adapted to send two TV signals: the regular TV signal which includes the main program mixed with additional content, and a clear screen TV signal which includes only the main program. Transmission of the TV signals is done using the operator 22 as discussed above. In an embodiment, the broadcaster 50 is adapted to send the additional content separately for viewing on a portable computing device 56 at the user's location. This may be done in a variety of ways.

In a non-limiting example of implementation, the additional content 32 may be sent to a clear screen server 52 over a telecommunications network 54. The telecommunications network 54 may include a portion, all or none of the telecommunications network 42 used by the operator 22 to transfer the TV signals to the STB 44. In the present embodiment, the user may use their portable computing device 56 to register and/or open a profile with the clear screen server 52. In an embodiment, the registration comprises associating and/or pairing the portable computing device 56 with the STB 44 and/or the TV display 46. Communications between the portable computing device 56 and the clear screen server 52 may be done over a telecommunications network 58, using a web-interface or an application that may be installed on the portable computing device 56 whereby by activating the application, the user may choose the channel that they want to watch in clear screen mode. The clear screen server 52 may keep record of all subscribers and the computing device(s) 56 and STB 44 associated with each subscriber.

In an embodiment, the additional content 32 may be sent the clear screen server 52 in real time as the associated TV signal is being broadcasted or in near time (a bit before or after) to ensure synchronized display of the additional content on the portable device 56.

Figure 6A:
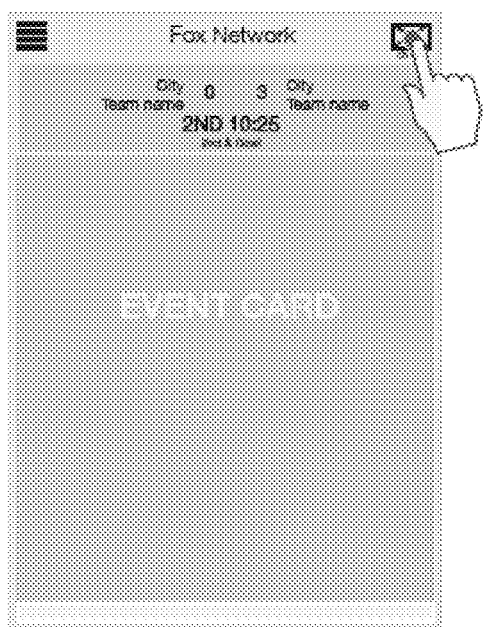
FIGS. 6a to 6e illustrate an example of how a user may select the clear screen mode using a portable computing device.
Figure 6B:
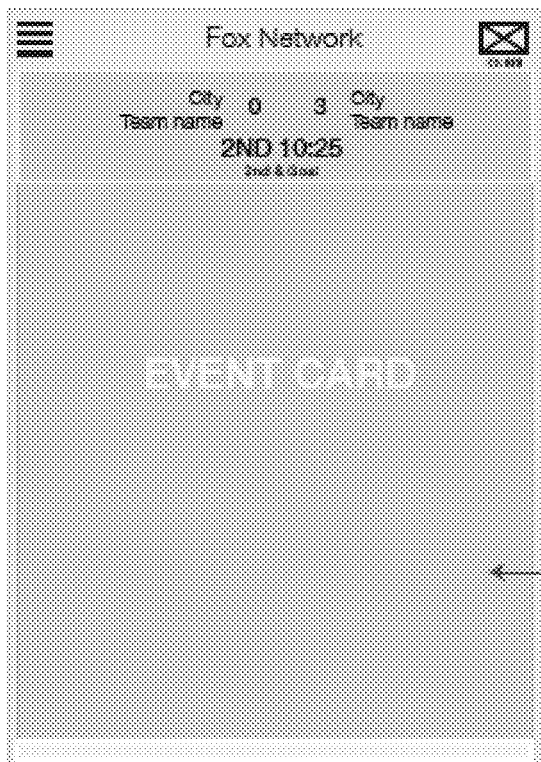
Figure 6C:
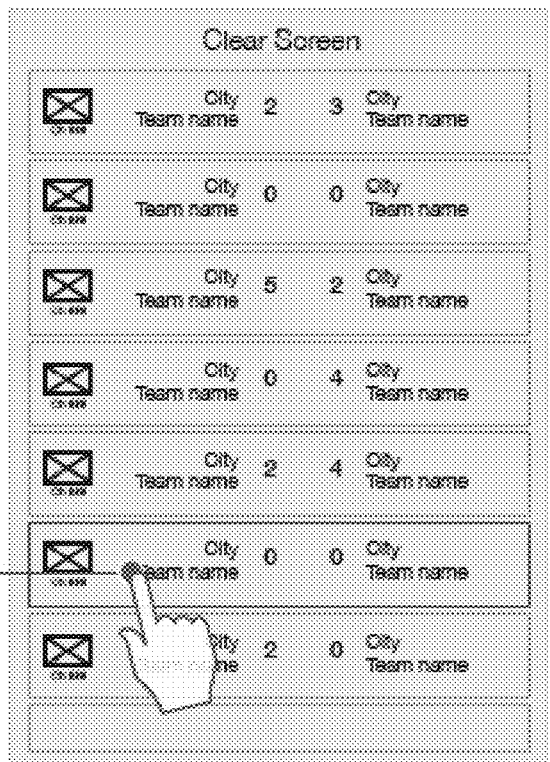
Figure 6D:
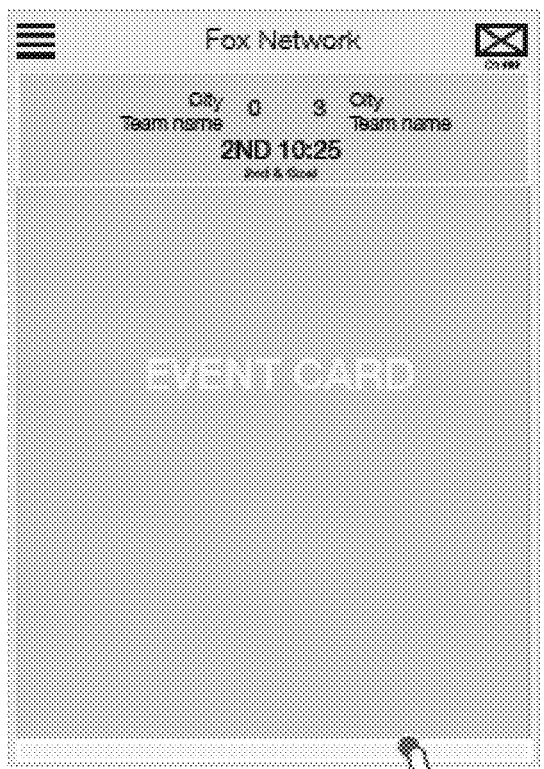
Figure 6E:
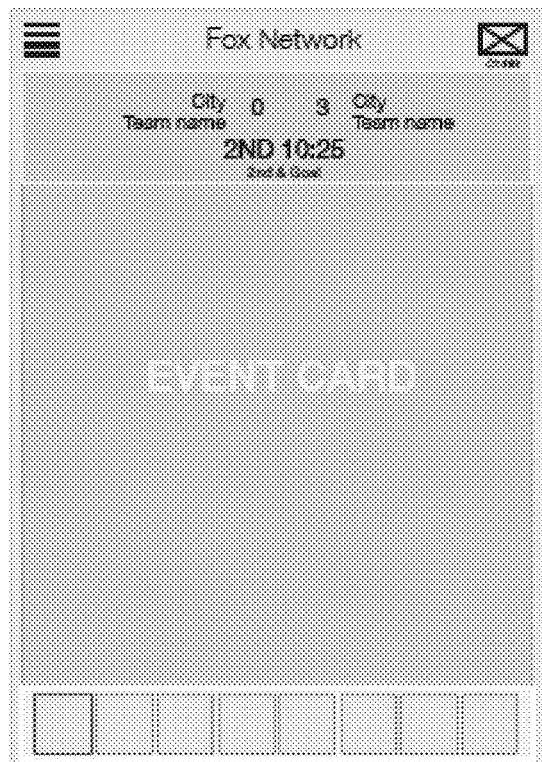

In a non-limiting example of operation, when a subscribed user wants to watch a certain channel in clear screen mode, the user may activate the application (or visit the website associated with the clear screen server 52) to choose the channel that they want to view in clear screen mode. The user may also have the option of choose the type of additional content that they want to view on the portable computing device 56. An example is shown in FIGS. 6a to 6e. For example, the user may select the channel that they want to view in clear screen mode as shown in FIGS. 6a to 6c. In an embodiment, the additional data may be provided in the form of event cards. The user may also view and access past event cards as illustrated in FIGS. 6d and 6e. In an embodiment, the server makes available a user interface which allows the computing device to interface with the server 52 to request authentication, receive and view the event cards, send a given event card for display on the TV display etc. The interface may be provided in the form of an app, a website, in the form of executable code or any combination of these or other methods that allow the computing device to interface with the server and/or the STB.

Upon receiving the user selection, the portable computing device 56 may send the selection to the clear screen server 52. The latter may verify/confirm that the selection is received from a subscribed user, or may verify the subscription status of the user associated with the portable computing device 56. The clear screen server 52 may then, send instructions to the STB 44 to switch to clear screen mode for the channel selected by the user. The clear screen server 52 may also send the additional content to the portable computing device 56 for viewing thereon while enjoying a clear screen on the TV display 46.

In the example of FIG. 5, the clear screen server 52 may communicate with the STB 44 over a telecommunications network 60. In an embodiment, the telecommunications networks 54, 58, and 60 are the same. In another embodiment, the telecommunications networks 54, 58, and 60 include a portion of each other. In a further embodiment, the telecommunications networks 54, 58, and 60 are completely independent.

In an embodiment, the instructions sent by the server 52 to the STB may include decryption keys which allow the STB to decode the clear screen TV signal provided by the broadcaster for a given channel.

In another example, activation of the clear screen mode may be done by activating the app and/or authenticating with the clear screen server 52. The server upon authentication may send instructions to the STB 44 to switch to clear screen mode. The STB 44 or computing device 56 may notify the server 52 of the channel being currently watched, and the server may then forward the additional content for that channel to the computing device. In a further embodiment, the server 52 may provide or make available the additional content of all channels that the user is subscribed to (entitled to watch) and the user may receive and view the additional content of the channel that they wish to see. In yet a further embodiment, the computing device 56 may act as a remote control whereby by selecting or pressing on a new channel a notification is sent to server 52 to provide additional content for the new channel and to the STB to switch channels.

In an embodiment, the user may also select additional content that is displayed on the computing device 56 and resend it to be displayed on the TV display 46. Whereby the user may have control of what additional content to show on the TV 46. For example, using an interface on the computing device 56 the user may select an event card and send it to TV 46. In an embodiment, the additional content sent by the computing device 56 is relayed to the STB 44 to encode in the signal sent to the TV display 46.

Figure 5A:
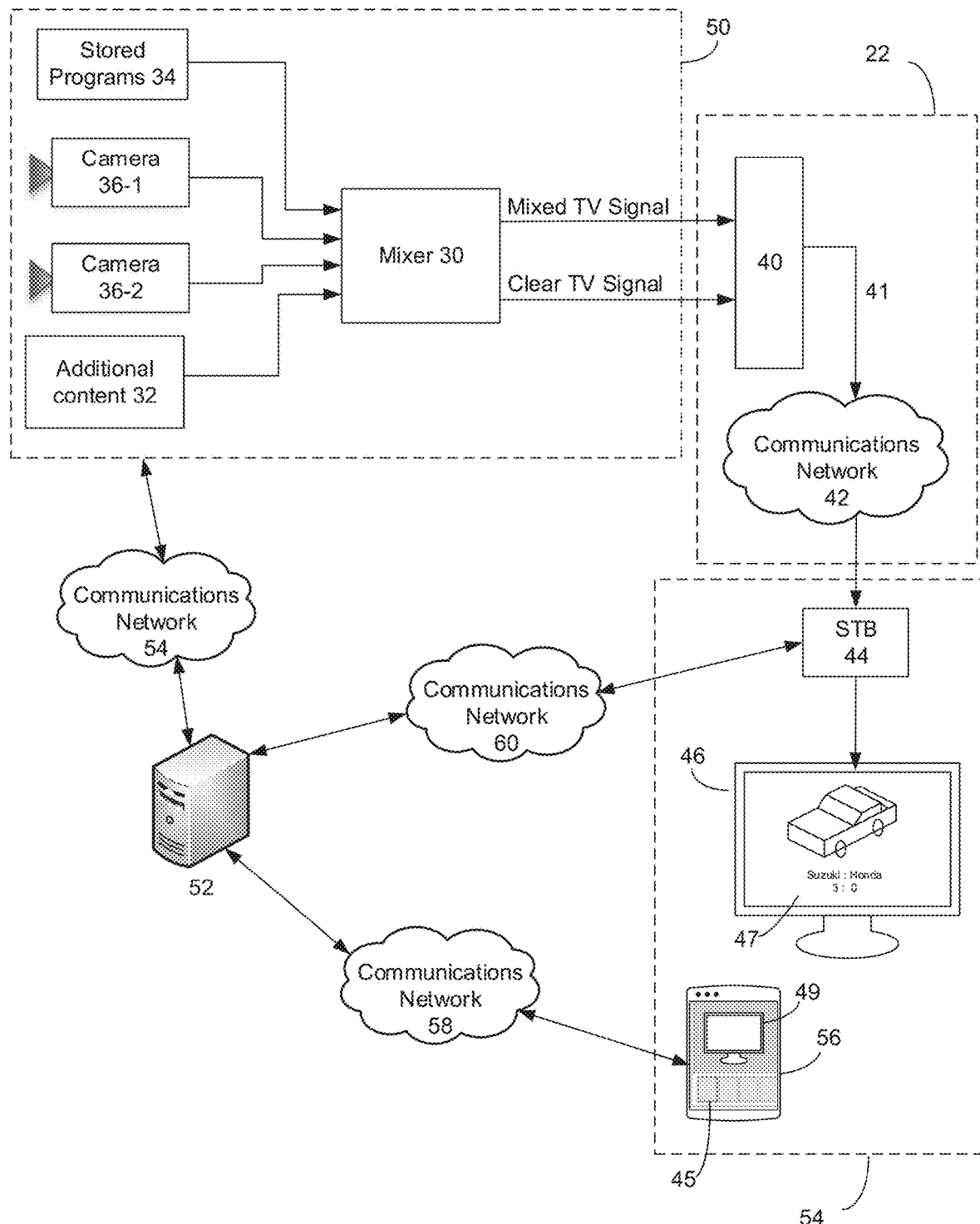
FIG. 5a is a block diagram of an exemplary system for clear screen TV broadcasting, in accordance with a further embodiment.

A non-limiting example of implementation is shown in FIG. 5*a*. As shown in FIG. 5*a* the user may select an event card 45 and drag it toward an area 49 of the interface (the area having the shape of a TV) whereby the event card selected and dragged may be sent to the TV 46 to be displayed in a window 47. In the example of FIG. 5*a* the user selected the score that is displayed on the computing device 56. The content of the event card was relayed to the STB and displayed in the window 47. In an embodiment, the user may have the option to select/adjust the size/dimensions of the window in which the content is to be displayed on the TV display 46, the location of the window on the TV display, the shape and the format of the window on the TV display 46.

Figure 7:
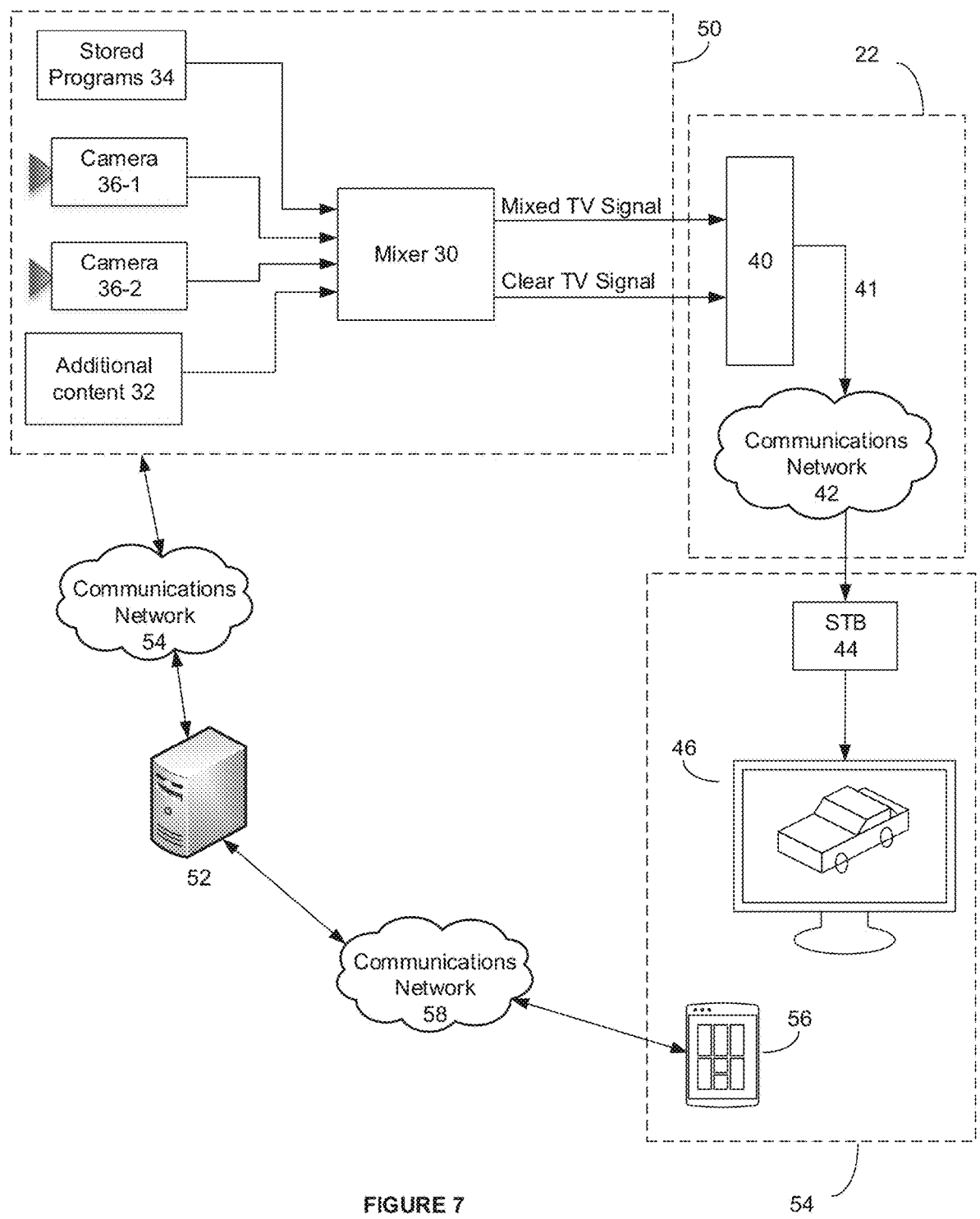
FIG. 7 is a block diagram of an exemplary system for clear screen TV broadcasting, in accordance with another embodiment.

FIG. 7 is a block diagram of an exemplary system for clear screen TV broadcasting, in accordance with another embodiment. In the embodiment of FIG. 7, the clear screen server 52 may send the instructions to the STB 44 via the broadcaster 50 over the telecommunications network 54 and then the operator 22 whereby upon authenticating a subscribed user, the clear screen server 52 may send an identification of the STB 44 associated with the user with/without an identification of the selected channel. Upon receiving the instructions, the STB 44 may either switch for clear screen modes on all the channels or for a selected channel depending on the way the STB 44 is configured.

Figure 8:
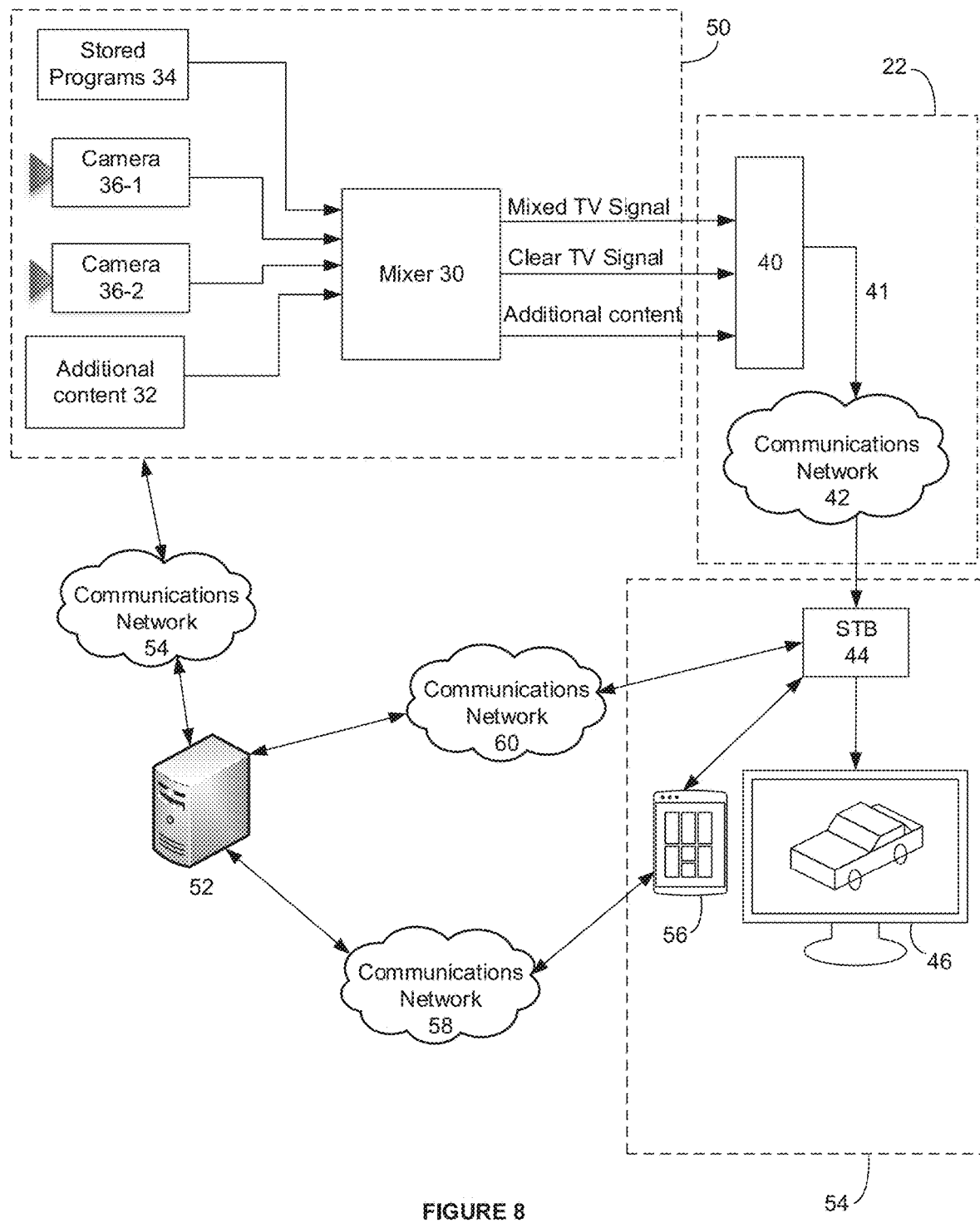
FIG. 8 is a block diagram of an exemplary system for clear screen TV broadcasting, in accordance with yet another embodiment.

FIG. 8 is a block diagram of an exemplary system for clear screen TV broadcasting, in accordance with yet another embodiment. In the embodiment of FIG. 8, the broadcaster 50 may send the mixed TV signal, the clear screen TV signal and the additional content via the operator 22. In the present case, when the clear screen server 52 authenticates a subscribed user the server may send instructions to the STB 44 to switch to clear screen and to send the additional content to the portable computing 56 using a direct link, a home network or the like.

In an embodiment, a set-top box (STB) is provided for implementing the aforementioned embodiments. An STB in accordance with the embodiments may include an input module adapted to receive the encoded cable signal comprising the mixed TV signal and the clear screen TV signal, an output for connecting to a TV display or a TV projector, a processor for receiving a user selection of the given channel and decoding the encoded cable signal associate with that channel to output a decoded video signal for display on the TV display or TV projector. A communication interface may also be provided to interface with the clear screen server 52 over a communications network for receiving instructions to switch between the mixed mode and the clear screen mode. The STB 44 may be also adapted to receive the additional content from the server 52 or the cable provider 22 and send the additional content to the computing device 56 associated therewith the STB using a home network.

The STB may also be adapted to receive a user selection of a given additional content while in the clear screen mode and insert the additional content in the video signal for display on the TV display even in the clear screen mode.

Figure 9:
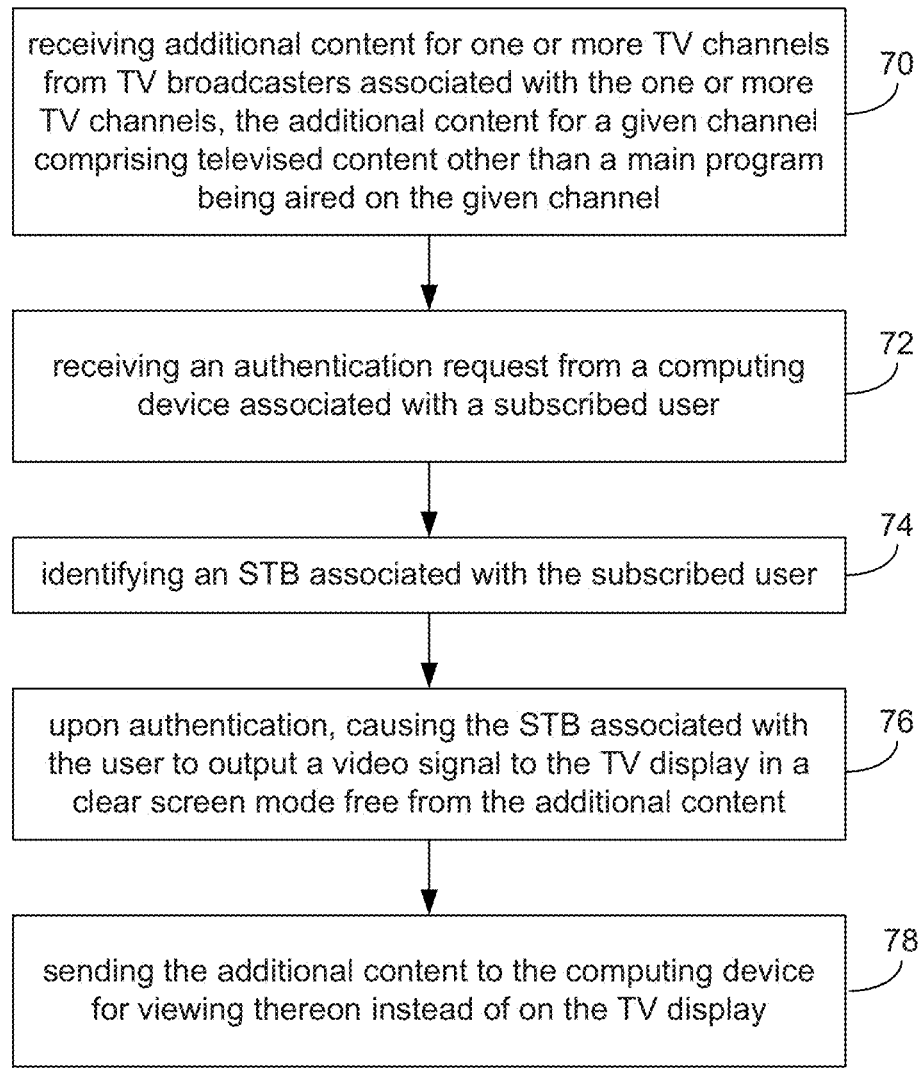
FIG. 9 is flowchart of a method for providing clear screen TV broadcasting to a user, in accordance with an embodiment.

FIG. 9 is flowchart of a method for providing clear screen TV broadcasting to a user having a set-top box (STB) and a TV display connected to the STB. As shown in FIG. 9, the method begins at step 70 by receiving additional content for one or more TV channels from TV broadcasters associated with the one or more TV channels, the additional content for a given channel comprising televised content other than a main program being aired on the given channel. Step 72 comprises receiving an authentication request from a computing device associated with a subscribed user. Step 74 comprises identifying an STB associated with the subscribed user. Step 76 comprises, upon authentication, causing the STB associated with the user to output a video signal to the TV display in a clear screen mode free from the additional content. Step 78 comprises sending the additional content to the computing device for viewing thereon instead of on the TV display.

Hardware and Operating Environment

Embodiments of the invention may be implemented/operated using a client machine.

The client machine can be embodied in any one of the following computing devices: a computing workstation; a desktop computer; a tablet, a laptop or notebook computer; a server; a handheld computer; a mobile telephone; a portable telecommunication device; a media playing device; a gaming system; a mobile computing device; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the client machine can be a mobile device or any other mobile computing device capable of performing the methods and systems described herein.

Still other embodiments of the client machine include a mobile client machine that can be any one of the following: any one series of Blackberry, Playbook or other handheld device manufactured by Research In Motion Limited; the iPhone manufactured by Apple Computer; Windows Phone 7, HTC, Sony Ericsson, any telephone or computing device running the Android operating system, or any handheld or smart phone; a Pocket PC; a Pocket PC Phone; or any other handheld mobile device supporting Microsoft Windows Mobile Software, etc.

The client machine may include a display and a touch-sensitive surface. It should be understood, however, that the computing device may also include one or more other physical user interface devices, such as a physical keyboard, a mouse and/or a joystick. In another embodiment, the computing device may include or be operably connected to a motion detector or a vision based interface (such as a virtual keyboard) for receiving the user's inputs.

The client machine may be in communication with a remote server via a communication network. In another implementation, the data may be loaded from a local database or from local data files e.g. XML, JSON etc.

Figure 10:
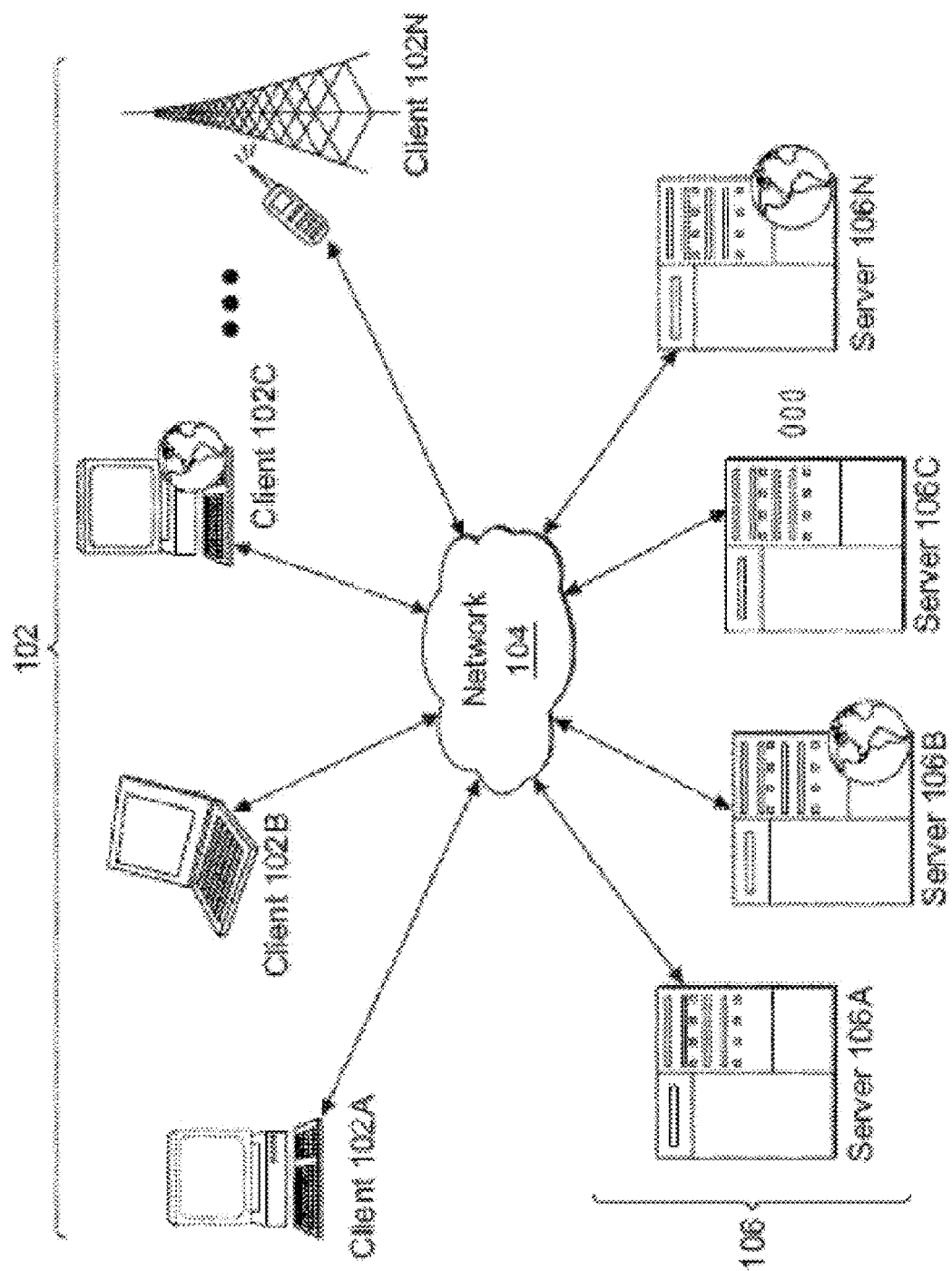
FIG. 10 illustrates an example of a suitable computing environment for implementing the embodiments.

FIG. 10 illustrates an embodiment of a computing environment 101 that includes one or more client machines 102A-102N in communication with servers 106A-106N, and a network 104 installed in between the client machines 102A-102N and the servers 106A-106N. In some embodiments, client machines 102A-10N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

The client machine 102 may in some embodiments execute, operate or otherwise provide an application that can be any one of the following: software; a program; executable instructions; a web browser; HTML5; Javascript; WebGL; a web-based client; a client-server application; a thin-client computing client; software related to voice over internet protocol (VoIP) communications like a soft IP telephone; an application for streaming video and/or audio; an application for facilitating real-time-data communications; a HTTP client; a FTP client; an Oscar client; a Telnet client; any application from any application store such as Apple's app store, or the Google play store, or the Amazon app store, or blackberry; or any other type and/or form of executable instructions capable of executing on client machine 102. Still other embodiments may include a computing environment 101 with an application that is any of either server-based or remote-based, and an application that is executed on the server 106 on behalf of the client machine 102. The client machine 102 may include a network interface to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g ATM, Gigabit Ethernet, Ethernet-over-SONET), wireless connections, or some combination of any or all of the above.

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server.

The network 104 between the client machine 102 and the server 106 is a connection over which data is transferred between the client machine 102 and the server 106. Although the illustration in FIG. 14 depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network comprised of multiple sub-networks located between the client machines 102 and the servers 106; a primary public network with a private sub-network; a primary private network with a public sub-network; or a primary private network with a private sub-network. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: LTE, AMPS; TDMA; CDMA; GSM; GPRS UMTS; or any other protocol able to transmit data among mobile devices to accomplish the systems and methods described herein.

While preferred embodiments have been described above and illustrated in the accompanying drawings, it will be evident to those skilled in the art that modifications may be made without departing from this disclosure. Such modifications are considered as possible variants comprised in the scope of the disclosure.

For example while the TV display being shown as a television device, it should also be noted that the TV display may also comprise a TV/video projector or any type of devices that produce or display images from a video signal.

The invention claimed is:

1. A method for providing clear screen TV broadcasting to a user having a set-top box (STB) and a TV display connected to the STB, the method comprising:
 receiving a mixed TV signal and a clear screen TV signal, concurrently and simultaneously, wherein the mixed TV signal comprises a main program and additional content for one or more TV channels from TV broadcasters associated with the one or more TV channels, the additional content for a given channel comprising televised content other than the main program being aired on the given channel and to be displayed with the main program or over the main program, wherein the clear screen TV signal comprises the main program, identical as in the mixed TV signal but free from the additional content;

receiving an authentication request from a computing device associated with a subscribed user;

identifying an STB associated with the subscribed user;

upon authentication, causing the STB associated with the user to switch from:

decoding only the mixed TV signal and not the clear screen TV signal, and outputting a video signal to the TV display in a mixed mode comprising the main program and the additional content;

to decoding only the clear TV signal and not the mixed screen TV signal, and outputting the video signal to the TV display in a clear screen mode free from the additional content;

sending the additional content to the computing device for viewing thereon instead of on the TV display;

providing the additional content as event cards for selection and viewing on the computing device, and receiving a user selection of one of the event cards, sending the additional content associated with the selected one of the event cards to the STB; and displaying the additional content associated with the selected one of the event cards on the TV display.

2. The method of claim 1, further comprising:

identifying a channel being currently watched on the TV display;

sending the additional content associated with the channel being currently watched to the computing device for display.

3. The method of claim 2, wherein the identifying comprises receiving an identification of the channel being currently watched from the STB or the computing device.

4. The method of claim 1, further comprising upon authentication sending instructions to the STB to switch to a clear screen mode for all channels.

5. The method of claim 1, wherein causing the STB to output comprises sending instructions to the STB to detect and decode a different TV signal for the given channel.

6. The method of claim 1, wherein causing the STB to output comprises sending decryption keys to the STB to decode an encrypted clear screen TV signal for the given channel.

7. A set-top box (STB) for providing clear screen TV broadcasting, the STB comprising:

an input for receiving an encoded cable signal from a cable TV provider, the encoded cable signal comprising, concurrently and simultaneously for a given channel, a mixed TV signal and a clear screen TV signal, wherein the mixed TV signal comprises a main program and additional televised content to be displayed with the main program or over the main program, and the clear screen TV signal comprises the main program free from the additional content;

an output for connecting to a TV display;

a processor for decoding, at a given time, only one of the mixed TV signal and the clear screen TV signal from the encoded cable signal to output a video signal representative of the given channel on the TV display;

a communication interface for interfacing with a remote device for receiving instructions to switch between a mixed mode and a clear screen mode;

wherein, by default, the STB is for decoding only the mixed TV signal for the given channel to output a first video signal comprising the main program and the additional content, and upon receipt of instructions to switch to a clear screen mode the STB causes the processor to decode only the clear screen TV signal for the given channel to output a second video signal representing only the main program, identical as in the mixed TV signal but free from the additional content, the STB being also for receiving a user selection of an event card from a computing device, which is for viewing and selecting the additional content as event cards, and for sending the additional content associated with the selected event card to the TV display for displaying on the additional content.

8. The STB of claim 7, wherein the STB is for receiving the additional content and send the additional content to a home device associated with the STB using a home network, the home device being different than the remote device.

9. The STB of claim 8, wherein the STB receives the additional content from the remote device or the cable TV provider.

10. The STB of claim 7, wherein the STB is for receiving a user selection of a given additional content while in the clear screen mode and insert the additional content in the second video signal for output on the TV display in the clear screen mode.

11. The STB of claim 7, wherein the STB is for receiving decryption keys for decrypting the clear screen TV signal.

12. A system for providing clear screen TV broadcasting to a user from a broadcaster for sending, concurrently and simultaneously, a main program in a mixed TV signal comprising the main program and additional content other than the main program and to be displayed with the main program or over the main program, and in a clear screen TV signal including only the main program, the user having a TV display connected and a set-top box (STB) for decoding, by default, the mixed TV signal only and output the video signal to the TV display, the system comprising:

a server comprising a list of subscribed users and an identification of an STB associated with each subscribed user, the server being for receiving the additional content from the broadcaster for a given channel, wherein upon receiving an authentication request from a computing device associated with a subscribed user, the server identifies the STB associated with the subscribed user and causes the STB to decode the clear TV signal only instead of the mixed TV signal to output a video signal to the TV display representing only the main program, identical as in the mixed TV signal but free from the additional content;

the server being also for sending the additional content to the computing device after authentication for viewing thereon instead of on the TV display, wherein the system provides the additional content in the form of event cards for selection and viewing on the computing device, and is for receiving a user selection of one of the event cards for viewing on the TV display, and for sending the one of the event cards to the STB for adding the additional content associated to the selection of one of the event cards to the clear TV signal.

13. The system of claim 12, wherein the server is for providing the STB with decryption keys for decrypting the clear TV signal.

14. The system of claim 12, wherein the server provides the additional content in real time or near time for displaying on the computing device in accordance with a progress of the main program on the TV display.

15. The system of claim 12, wherein the system is for making available a set of computer readable instructions which when received and executed on the computing device implement an interface which allows the user to request authentication and receive the additional content from the server.

* * * * *